United States Patent [19]
Kunde

[11] Patent Number: 5,795,971
[45] Date of Patent: Aug. 18, 1998

[54] AMINOMETHYLNAPHTHALENECARBOXLIC ACID DYESTUFFS

[75] Inventor: Klaus Kunde, Neunkirchen-Seelscheid, Germany

[73] Assignee: Bayer Aktiengesellschaft, Leverkusen, Germany

[21] Appl. No.: 921,781

[22] Filed: Sep. 2, 1997

[30] Foreign Application Priority Data

Sep. 9, 1996 [DE] Germany ............... 196 36 540.6

[51] Int. Cl.$^6$ .................. C09B 31/08; C09B 62/09; C07C 309/35
[52] U.S. Cl. ............ 534/637; 534/642; 534/730; 534/819; 534/829; 534/797; 562/47
[58] Field of Search ................ 534/730, 819, 534/829, 637; 562/47

[56] References Cited

U.S. PATENT DOCUMENTS

| | | | |
|---|---|---|---|
| 4,963,189 | 10/1990 | Hindagolla | 534/836 X |
| 5,225,545 | 7/1993 | Lauk | 534/829 |
| 5,288,294 | 2/1994 | Kaser | 8/687 |
| 5,512,663 | 4/1996 | Kunde | 534/633 |
| 5,580,965 | 12/1996 | Jäger | 534/829 |

FOREIGN PATENT DOCUMENTS

| | | |
|---|---|---|
| 0 356 080 | 2/1990 | European Pat. Off. |
| 0 534 903 | 3/1993 | European Pat. Off. |
| 0 622 424 | 11/1994 | European Pat. Off. |
| 0 735 106 | 10/1996 | European Pat. Off. |
| 91/08265 | 6/1991 | WIPO |
| 95/00592 | 1/1995 | WIPO |

OTHER PUBLICATIONS

Chemische Berichte K. Schank, vol. 102, No. 2 (1969) p. 383.
Chemische Berichte, Sense et al., 102, 509–521 (1969).
Klamann et al., Chem. Ber., 93, 2316–2325 (1960).

*Primary Examiner*—Fiona T. Powers
*Attorney, Agent, or Firm*—Sprung Kramer Schaefer & Briscoe

[57] ABSTRACT

The novel aminomethylnaphthalenecarboxylic acid dyestuffs of the formula (I)

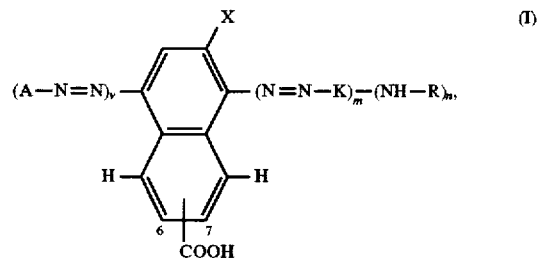

in which the substituents and indices have the meaning given in the description, are outstandingly suitable for dyeing cellulosic materials, in particular paper.

12 Claims, No Drawings

AMINOMETHYLNAPHTHALENECARBOXLIC ACID DYESTUFFS

The present invention relates to novel dyestuffs of the general formula (I)

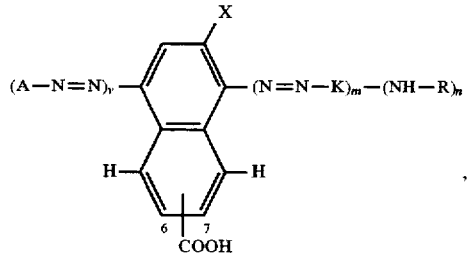

in which

A and K independently of one another represent in each case optionally substituted phenyl or naphthyl, R represents hydrogen, an unsubstituted acyl radical or a 1,3,5-triazine or pyrimidine radical, each of which is substituted in an identical or different manner by chlorine, fluorine or an aniline or naphthylamine radical which is substituted by β-sulfatoethylsulfonyl or vinylsulfonyl, X represents $C_1-C_3$-alkyl, the carboxyl group is bonded in position 6 or 7, m and n represent 0 or 1, where n represents 1 if m represents 0, and v represent 0 or 1, with the proviso that v+m>1.

Preferred dyestuffs of the general formula (I) are those in which

A represents phenyl or naphthyl which are in each case substituted once to 4 times in an identical or different manner by $CH_3$, OH, $OCH_3$, $SO_2C_2H_3$, $SO_2C_2H_4OSO_3H$, COOH, $SO_3H$ or NHR', in which R' represents hydrogen, an unsubstituted acyl radical or a 1,3,5-triazine or pyrimidine radical, each of which is substituted in an identical or different manner by chlorine, fluorine or an aniline or naphthyl-amine radical which is substituted by β-sulfatoethylsulfonyl or 5 vinylsulfonyl, and K represents phenyl or naphthyl which are substituted once to 4 times in an identical or different manner by $CH_3$, OH, $OCH_3$, $OC_2H_5$, COOH, $SO_3H$ or $NR_1R_2$, in which $R_1$ and $R_2$ independently of one another represent hydrogen, optionally substituted $C_1-C_{18}$-alkyl, phenyl or naphthyl.

Particularly preferred dyestuffs of the formula (I) are those in which the carboxyl group is bonded in position 6 and X represents $CH_3$.

Preferred dyestuffs of the general formula (I) are furthermore those in which

A represents hydrogen or a radical of the formulae (III) to (XIV)

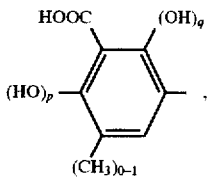

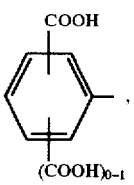

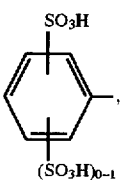

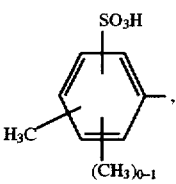

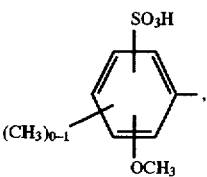

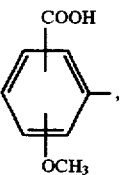

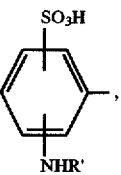

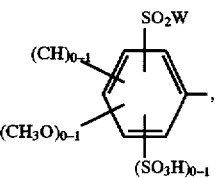

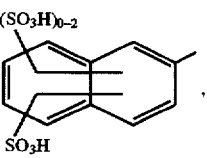

-continued

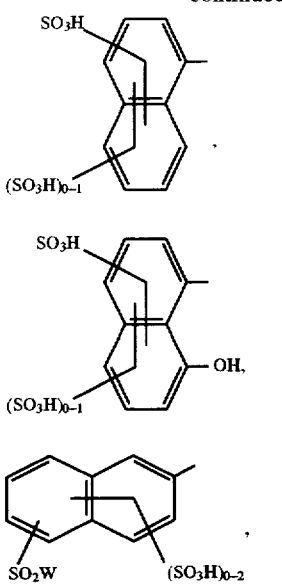

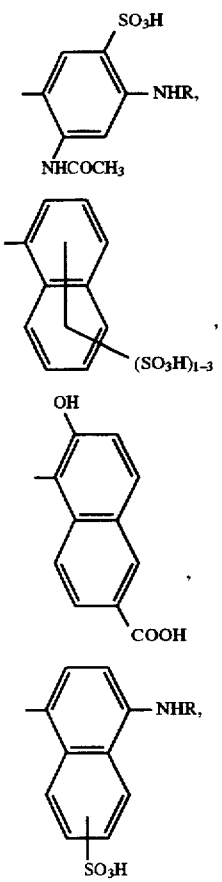

in which

W represents $C_2H_4OSO_3H$ or $C_2H_3$ and p and q represent 0 or 1 and p+q=1

Dyestuffs of the general formula (I) which are furthermore preferred are those in which K represents a radical of the formulae (XV) to (XXI)

(XV)

(XVI)

(XVII)

(XVIII)

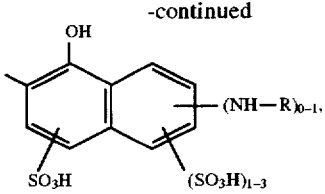

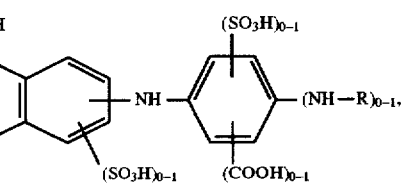

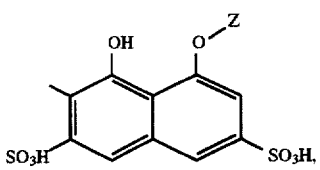

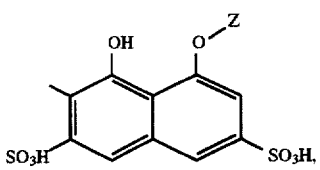

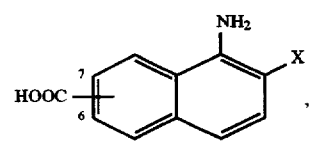

in which Z represents hydrogen, $CH_3$ or $C_2H_5$.

The use of compounds of the general formula (XXII)

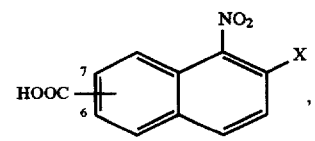

in which

X represents $C_1$–$C_3$-alkyl and the carboxyl group is bonded in the 6- or 7-position, as a diazo or coupling component for the preparation of azo dyestuffs is novel and the present invention likewise relates to this use.

The compounds of the general formula (XMI) can be prepared by reducing compounds of the general formula (XXIII)

(XXIII)

in which

X represents $C_1$–$C_3$-alkyl and the carboxyl group is bonded in the 6- or 7-position, with hydrogen in the presence of metal or metal oxide catalysts, preferably Raney nickel. The reduction is preferably carried out in aqueous, neutral or weakly alkaline solution or in an organic solvent, preferably methanol.

The preparation of the compounds of the general formula (XXIII) is described for X=$CH_3$ (cf. Klamann and Kr amer, Chem. Ber. 93 (1960), 2316–2325) and for X=$C_2H_5$ and $C_3H_7$ it can be carried out analogously.

The dyestuffs of the formula (I) according to the invention where m=0 and v=1 can be prepared by diazotizing amines of the formula A—$NH_2$, in which A has the abovementioned meaning, and coupling these diazotization products in a manner known per se with the compounds of the general formula (XXII)

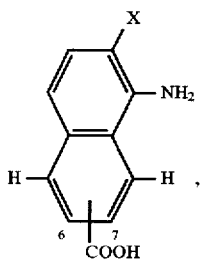

in which the carboxyl group is bonded in the 6- or 7-position and X represents $C_1$-$C_3$-alkyl, and, if appropriate, either acylating the coupling products, depending on the meaning of the substituent R, or subjecting them to a condensation reaction with substituted 1,3,5-triazines or pyrimidines.

The dyestuffs of the general formula (I) according to the invention where m=1 can be prepared by converting compounds of the general formula (XXV)

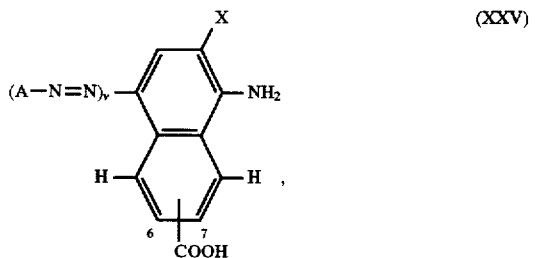

in which

X, A and v have the abovementioned meaning and the carboxyl group is bonded in the 6- or 7-position, into the corresponding diazonium compound in a manner known per se and coupling this with a coupling component of the general formula (XXIV)

H—K(NH—R)$_n$          (XXIV)

in which

K, R and n have the abovementioned meaning, in a manner known per se.

The dyestuffs of the general formula (I) according to the invention are suitable for dyeing and printing cellulosic materials, in particular paper and cotton.

The use of compounds of the general formula (XXII) for -the preparation of azo dyestuffs is novel. They can be employed both as diazonium and as coupling components; their use as the central component in series couplings, i.e. after a diazonium compound has been coupled with a compound of the formula (XXII), the resulting aminoazo compound is diazotized and the diazonium compound thus obtained is coupled with a coupling component, is preferred.

The coupling components of the formula (XXIV) are known in principle or can be prepared in a known manner, with the exception of the coupling component of the formula (XXII)

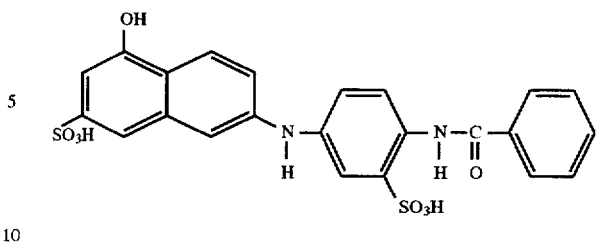

according to Example 9, which is new and to which the present invention likewise relates.

The diazotization of compounds of the general formula (XXV) and coupling of the diazonium compounds thus obtained with coupling components of the general formula (XXIV) are carried out under conditions which are known per se, in aqueous solution or suspension at temperatures between −5° C. and 40° C.; preferably between 0° C. and 20° C.

Couplings of diazonium compounds, which are obtained in a known manner from the amines A—NH$_2$, with compounds of the formula (XXII) are preferably carried out at pH values between 0.5 and 5; pH values between 1 and 3 at temperatures between −5° C. and 40° C. are particularly advantageous; preferably between 0° C. and 20° C.

Compared with the aminonaphthalenecarboxylic acids described to date, the compounds of the general formula (XXII) have the advantage of better accessibility, since the 1-nitro-2,6-dialkylnaphthalenes used for the preparation of the compounds of the formula (XXIII) in their turn can easily be obtained from the industrially available 2,6-dialkylnaphthalenes. 2,6-Dialkylnaphthalenes, for example 2,6-dimethylnaphthalene, are precursors for 2,6-naphthalenedicarboxylic acid polyesters used industrially. Furthermore, when used as coupling components, the compounds of the general formula (XXII) have the advantage that only one aminoazo compound can be obtained, since coupling in the ortho-position relative to the amino group is excluded.

The condensation of dyestuffs of the general formula (I) where n=1 and R=hydrogen with carboxylic acid chlorides or anhydrides or with substituted 1,3,5-triazines or pyrimidines, which is carried out if appropriate, takes place under conditions known per se in aqueous solution or suspension at temperatures between 0° and 80° C. and pH values between 3 and 10, preferably between 5 and 8.

The benzene and naphthalene derivatives which, in the processes according to the invention, give the radicals of the general formulae (III) to (XXI), and their use as diazo and coupling components are described extensively in the literature.

The dyestuffs according to the invention produce light-fast dyeings and prints by the customary dyeing processes on cellulosic materials, in particular on paper and cotton and regenerated cellulose fiber.

The dyestuffs can be used by all the processes customary for substantive dyestuffs in the paper and textile industry, in particular in pulp and in surface dyeing of paper for sized and unsized grades, starting from bleached or unbleached cellulose of various origins, such as softwood or hardwood sulfite and/or sulfate cellulose. They can also be used in the dyeing of yarn or piece-goods of cotton, viscose and linen by the exhaust process from a long liquor or in continuous processes.

For dyeing paper in the pulp, the dyestuffs can be added to the paper pulp before sheet formation, either to the thick matter after breaking up the cellulose or to the thin matter before feeding to the papermaking machine. In the preparation of paper sized in the pulp, they are preferably added to the thin matter before addition of the sizing agent.

In the case of surface dyeing, the dyestuff is applied after sheet formation. This is preferably effected in the size press by dissolving the dyestuff in a concentrated starch solution and applying it to the paper in this form.

The dyestuffs of the formula (I) can be employed as solid dyestuff preparations, preferably as powders or granules, which optionally comprise customary additives, such as, for example, ionic or nonionic formulating agents and/or dust removal agents.

The use of liquid preparations, in particular the use of concentrated aqueous solutions, which are preferably free from organic solubilizers and comprise at least one dyestuff of the general formula (I), is preferred for the process according to the invention. The liquid dyestuff preparations in general comprise 10 to 40 % by weight, preferably 20 to 40% by weight, of at least one dyestuff of the formula (I), based on the finished preparation.

EXAMPLE 1

23.1 g of 6-methyl-5-nitronaphthalene-2-carboxylic acid and 10 g of sodium bicarbonate are dissolved in 500 ml of water and reduced at 25° C. over a little Raney nickel under a hydrogen pressure of 70 bar. When the reduction has ended, the catalyst is filtered off and the filtrate is acidified to a pH of 2 with concentrated hydrochloric acid. The 5-amino-6-methylnaphthalene-2-carboxylic acid which has precipitated out is filtered off and dried.

EXAMPLE 2

45.9 g of 4-amino-5-phenylsulfonyloxynaphthalene-2,7-disulfonic acid are dia-zotized with the equimolar amount of $NaNO_2$ in 500 ml of water at 0° to 5° C. and a pH of 1.5 to 2. After addition of 20.1 g of 5-amino-6-methylnaphthalene-2-carboxylic acid, the pH of the suspension is brought to 3 with sodium carbonate solution. The coupling is ended immediately. The pH of the solution of the coupling product is brought to 1.5 with hydrochloric acid and further diazotization is then carried out at 0° to 5° C. with the equimolar amount of $NaNO_2$.

40.0 g of 4-hydroxy-7-(4'-amino-3'-sulfophenylamino)-naphthalene-2-sulfonic acid are dissolved in 500 ml of water with sodium carbonate solution at 10° C. and a pH of 9. The above suspension of the diazonium compound is slowly added, the pH of the coupling solution being kept constant with sodium carbonate solution. The coupling is ended immediately. The coupling product is in solution, and corresponds to the following formula:

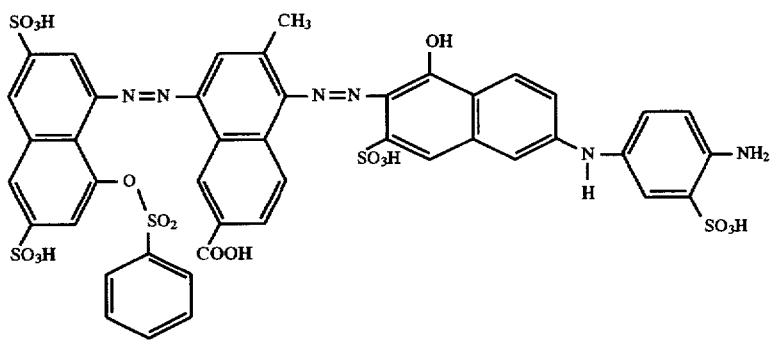

EXAMPLE 3

The solution of the coupling product from Example 2 is heated to 80° C. and the pH is then brought to 11.5 with concentrated sodium hydroxide solution. When the hydrolysis of the benzenesulfonic acid ester has ended, the pH of the solution is brought to 7 with hydrochloric acid. The dyestuff is precipitated out by addition of NaCl, isolated and dried, and corresponds to the following formula:

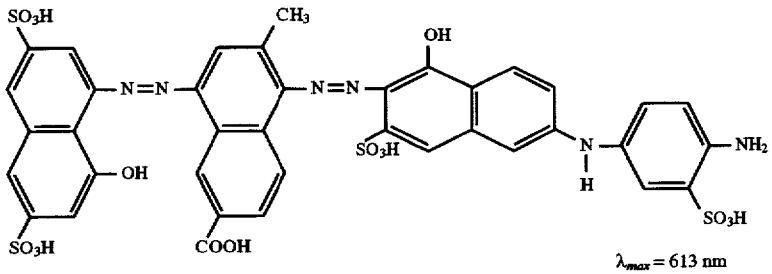

$\lambda_{max} = 613$ nm

It dyes paper, cotton and viscose a greenish-tinged blue with very good fastness to light.

EXAMPLE 4

The pH of the solution of the coupling product from Example 2 is brought to 6 with hydrochloric acid, and 21.1 g of benzoyl chloride are then added dropwise at 25° to 30° C., the pH being kept constant with sodium carbonate solution. When the condensation has ended, the solution is heated to 80° C. and the pH is then brought to 10.5 with concentrated sodium hydroxide solution and kept at this level until the benzenesulfonic acid ester is hydrolyzed completely. The pH is now brought to 7 with hydrochloric acid. The dyestuff is precipitated out by addition ofNaCl, isolated and dried, and corresponds to the following formula:

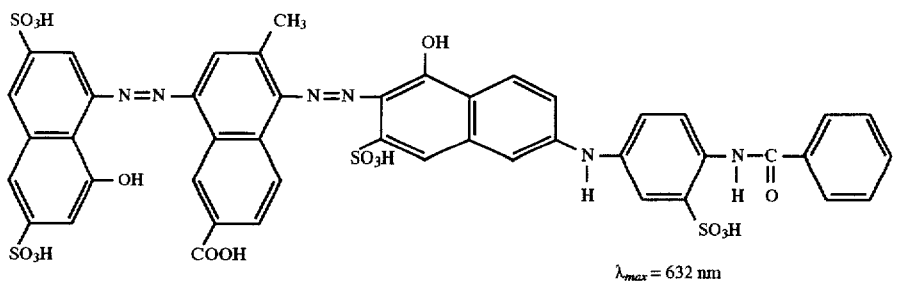

$\lambda_{max} = 632$ nm

It dyes paper, cotton and viscose a greenish-tinged blue with very good fastness to light.

EXAMPLE 5

The solution of the coupling product from Example 2 is heated to 80° C. and the pH is then brought to 11.5 with concentrated sodium hydroxide solution. When the hydrolysis of the benzenesulfonic acid ester has ended, the pH of the solution is brought to 6 with hydrochloric acid. The solution is cooled to 15° C. and 18.6 g of cyanuric chloride are added. During the condensation, the pH is kept at 6 with sodium carbonate solution. When the condensation has ended, the solution is heated to 40° C. and 16.3 g of metanilic acid are then added. The pH is also kept at 6 with sodium carbonate solution during this condensation. When the condensation has ended, the dyestuff is precipitated out withNaCl, isolated and dried, and corresponds to the following formula:

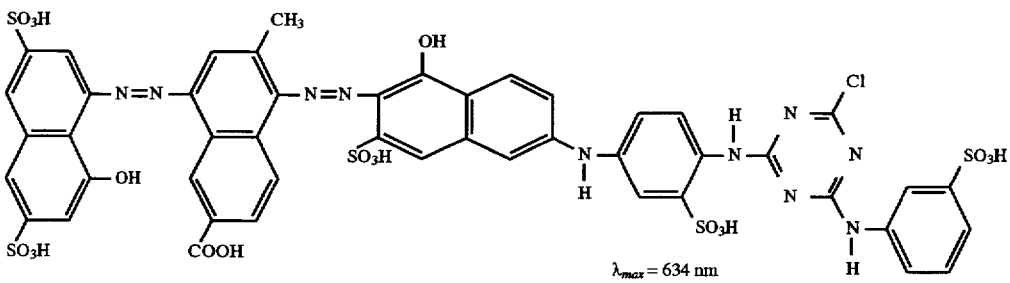

$\lambda_{max} = 634$ nm

It dyes cotton and viscose a greenish-tinged blue with very good fastness to light.

EXAMPLES 6, 7 and 8

If equimolar amounts of 4-hydroxy-7-(phenylamino)-naphthalene-2-sulfonic acid, 4-hydroxy-7-(3'-carboxyphenylamino)-naphthalene-3-sulfonic acid or 4-hydroxy-7-(4'-carboxyphenylamino)-naphthalene-2-sulfonic acid are used instead of the second coupling component employed in Example 2, dyestuffs which dye paper, cotton and viscose blue with very good fastness to light are obtained.

Example 6: $\lambda_{max}$=604 nm
Example 7: $\lambda_{max}$=604 nm
Example 8: $\lambda_{max}$=605 nm

EXAMPLE 9

40.0 g of 4-hydroxy-7-(4'-amino-3'-sulfophenylamino)-naphthalene-2-sulfonic acid are dissolved in 500 ml of water with sodium carbonate solution at 25° C. and a pH of 6, and 17.5 g of benzoyl chloride are then added dropwise, the pH being kept constant with sodium carbonate solution. The condensation product corresponds to the following formula:

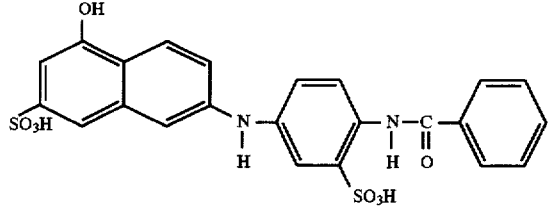

$^1$H-NMR for the disodium salt in $D_6$-DMSO: $\delta$=6.93 (s, 1H); 7.2 (d, 1H); 7.26 (d, 1H); 7.34 (d, 2H); 7.54–7.64 (m, 4H); 7.95 (m, 3H); 8.42 (d, 1H); 8.48 (s, 1H); 10.05 (s, 1H); 11.23 (s, 1H).

EXAMPLES 10–16

If equimolar amounts of the compounds shown in the following table are used instead of the diazo and the second coupling component employed in Example 2, dyestuffs which dye paper, cotton and viscose in the color shades stated with a good to very good fastness to light are likewise obtained.

| Ex. | Diazo component | 2nd coupling component | Color shade |
|---|---|---|---|
| 10 | 8-sulfo-3-amino-naphthalene-1-sulfonic acid (1,5-SO₃H, 3-NH₂ on naphthalene with SO₃H at 4) | 5-hydroxy-7-sulfo-2-(phenylamino)naphthalene | reddish-tinged blue $\lambda_{max}$ = 572 nm |
| 11 | 8-sulfo-3-amino-naphthalene-1-sulfonic acid | 5-hydroxy-7-sulfo-2-[(4-amino-3-sulfophenyl)amino]naphthalene | blue $\lambda_{max}$ = 585 nm |
| 12 | 4-amino-3-sulfo-benzanilide (benzoylamino on phenyl with NH₂ and SO₃H) | 5-hydroxy-7-sulfo-2-[(3-carboxyphenyl)amino]naphthalene | reddish-tinged blue $\lambda_{max}$ = 578 nm |
| 13 | 2-(4-amino-3-sulfophenyl)-6-methyl-7-sulfo-benzothiazole | 5-hydroxy-7-sulfo-2-[(4-carboxyphenyl)amino]naphthalene | reddish-tinged blue $\lambda_{max}$ = 571 nm |
| 14 | 2-amino-3-sulfo-5-nitro-benzene (O₂N, SO₃H, NH₂) | 5-hydroxy-7-sulfo-2-[(4-benzoylamino-3-sulfophenyl)amino]naphthalene | blue $\lambda_{max}$ = 584 nm |
| 15 | N-(4-amino-3-sulfophenyl)maleamic acid *) | 5-hydroxy-7-sulfo-2-[(4-amino-3-sulfophenyl)amino]naphthalene | blue $\lambda_{max}$ = 582 nm |
| 16 | 2-amino-3-sulfo-4,6-dimethyl-benzene | 5-hydroxy-7-sulfo-2-[(3-carboxyphenyl)amino]naphthalene | violet $\lambda_{max}$ = 559 nm |

*) The maleyl radical is split off by alkaline hydrolysis after the second coupling.

I claim:
1. A dyestuff of the general formula (I)

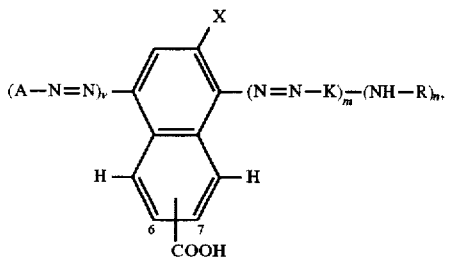

in which

A and K independently of one another represent in each case optionally substituted phenyl or naphthyl, R represents hydrogen, an unsubstituted acyl radical or a 1,3,5-triazine or pyrimidine radical, each of which is substituted in an identical or different manner by chlorine, fluorine or an aniline or naphthyl-amine radical which is substituted by β-sulfatoethylsulfonyl or vinylsulfonyl, X represents $C_1$–$C_3$-alkyl, the carboxyl group is bonded in position 6 or 7, m and n represent 0 or 1, where n represents 1 if m represents 0, and v represents 0 or 1, with the proviso that v+m≧1.

2. A dyestuff as claimed in claim 1, in which

A represents phenyl or naphthyl which are in each case substituted once to 4 times in an identical or different manner by $CH_3$, OH, $OCH_3$, $SO_2C_2H_3$, $SO_2C_2H_4OSO_3H$, COOH, $SO_3H$ or NHR', in which R' represents hydrogen, an unsubstituted acyl radical or a 1,3,5-triazine or pyrimidine radical, each of which is substituted in an identical or different manner by chlorine, fluorine or an aniline or naphthylamine radical which is substituted by β-sulfatoethylsulfonyl or vinylsulfonyl, K represents phenyl or naphthyl which are substituted once to 4 times in an identical or different manner by $CH_3$, OH, $OCH_3$, $OC_2H_5$, COOH, $SO_3H$ or $NR_1R_2$, in which $R_1$ and $R_2$ independently of one another represent hydrogen, optionally substituted $C_1$–$C_{18}$-alkyl, phenyl or naphthyl.

3. A dyestuff as claimed in claim 1, in which the carboxyl group is bonded in the 6-position and X represents $CH_3$.

4. A dyestuff as claimed in claim 1, in which

A represents hydrogen or a radical of the formulae (III) to (XIV)

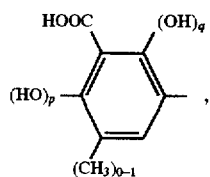

-continued

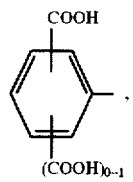 (IV)

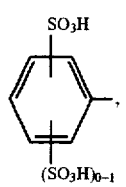 (V)

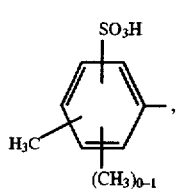 (VI)

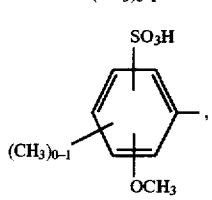 (VII)

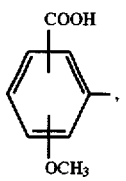 (VIII)

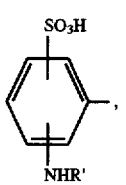 (IX)

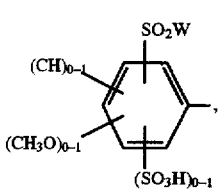 (X)

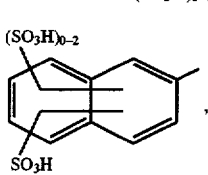 (XI)

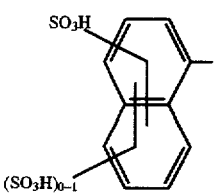 (XII)

-continued

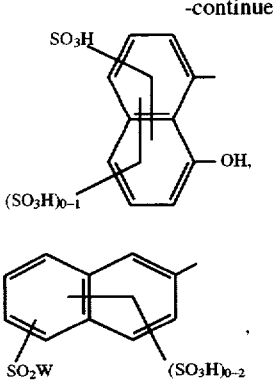

in which

W represents $C_2H_4OSO_3H$ or $C_2H_3$ and
p and q represent 0 or 1 and p+q=1.

5. A dyestuff as claimed in claim 1, in which
K represents a radical of the formulae (XV) to (XXI)

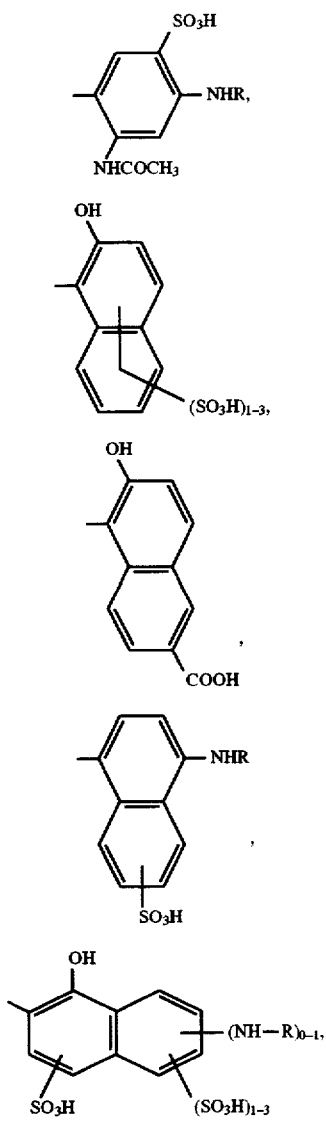

-continued

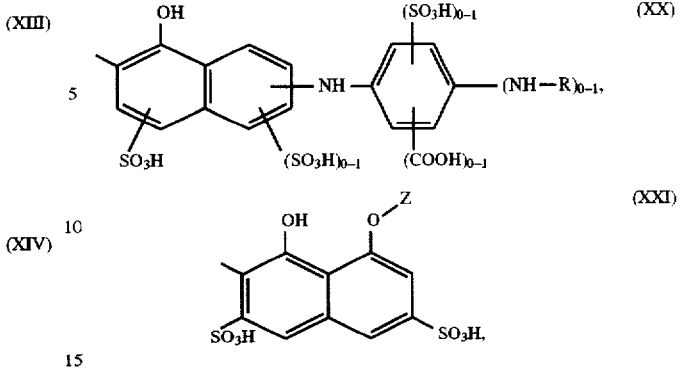

in which Z represents hydrogen, $CH_3$ or $C_2H_5$.

6. A process for the preparation of a dyestuff as claimed in claim 1, where m=0 and v=1, which comprises converting an amine of the formula A—$NH_2$, in which A has the meaning given in claim 1, into the diazonium compound and coupling this with a compound of the general formula (XXII)

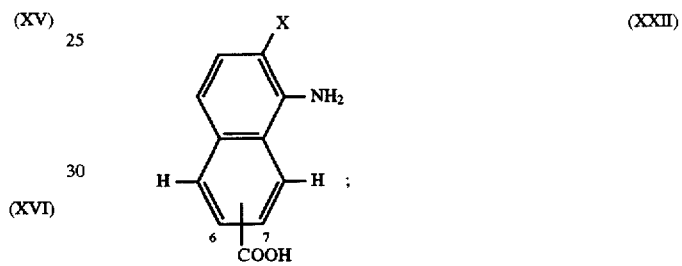

in which
the carboxyl group is bonded in the 6- or 7-position and X has the meaning given in claim 1, and optionally either acylating the coupling product, depending on the meaning of R, or subjecting it to a condensation reaction with a substituted 1,3,5-triazine or pyrimidine.

7. A process for the preparation of a dyestuff as claimed in claim 1, where m=1, which comprises converting a compound of the general formula (XXV)

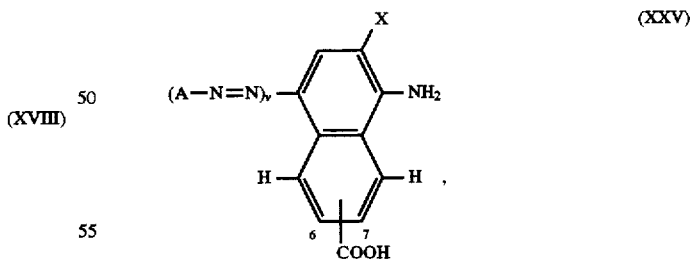

in which
Y, X and v have the meaning given in claim 1 and the carboxyl group is bonded in the 6- or 7-position, into the corresponding diazonium compound and coupling this with a coupling component of the general formula (XXIV)

H—K (NH—R)$_n$   (XXIV)

in which

K, R and n have the meaning given in claim 1.

8. A process for dyeing and printing cellulosic materials, which comprises applying thereto a dyestuff as claimed in claim 1.

9. A process of dyeing and printing as claimed in claim 8 wherein the cellulosic material is paper or cotton.

10. Cellulosic materials dyed with a dyestuff of claim 1.

11. The cellulosic materials as claimed in claim 10 which are paper or cotton.

12. The compound of the formula

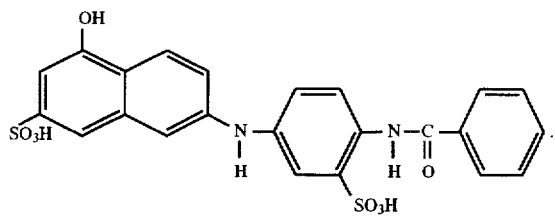

\* \* \* \* \*